United States Patent [19]

Barrett

[11] Patent Number: 5,341,442
[45] Date of Patent: Aug. 23, 1994

[54] METHOD AND APPARATUS FOR COMPRESSION DATA BY GENERATING BASE IMAGE DATA FROM LUMINANCE AND CHROMINANCE COMPONENTS AND DETAIL IMAGE DATA FROM LUMINANCE COMPONENT

[75] Inventor: Peter T. Barrett, Palo Alto, Calif.

[73] Assignee: SuperMac Technology, Inc., Sunnyvale, Calif.

[21] Appl. No.: 111,268

[22] Filed: Aug. 24, 1993

Related U.S. Application Data

[63] Continuation of Ser. No. 823,156, Jan. 21, 1992, abandoned.

[51] Int. Cl.$^5$ .............................................. G06K 9/00
[52] U.S. Cl. ..................................... 382/56; 348/410; 348/421
[58] Field of Search .................. 382/56; 348/393, 395, 348/396, 397, 398, 410, 420, 421; 358/427

[56] References Cited

U.S. PATENT DOCUMENTS

| | | | |
|---|---|---|---|
| 4,742,558 | 5/1988 | Ishibashi et al. | 382/56 |
| 4,745,473 | 5/1988 | Hall | 358/13 |
| 4,764,805 | 8/1988 | Rabbani et al. | 358/133 |
| 4,908,697 | 3/1990 | Tsinberg et al. | 358/133 |

OTHER PUBLICATIONS

P. J. Ready and D. J. Spencer, "Block Adaptive DPCM Transmission of Images," in NTC Conference Record, 22-10 to 22-17 (1975).

O. R. Mitchell, E. J. Delp, and S. G. Carlton, "Block Truncation Coding: A New Approach to Image Compression," in Proceedings of the ICC, 12B.1.1-12B.1.4 (1978).

M. D. Lema and O. R. Mitchell, "Absolute Moment Block Truncation Coding and its Application to Color Images," in IEEE Transactions on Communications, COM-32(10), 1148-1157 (1984).

T. S. Haung and A. B. S. Hussain, "Facsimile Coding by Skipping White," in IEEE Transactions on Communications, COM-23(12), 1452-1460 (1975).

*Primary Examiner*—David K. Moore
*Assistant Examiner*—Matthew C. Bella
*Attorney, Agent, or Firm*—Limbach & Limbach

[57] ABSTRACT

A method and apparatus for compressing YUV color image data representing an image. The method includes the steps of generating base image data containing low frequency image information where the base image data is a function of the Y component, the U component, and the V component, and generating detail image data containing high frequency image information where the detail image data is a function of the Y component alone. The base image data can be decompressed to from a decompressed base image data that is an approximate facsimile of the original image and the detail image data can be decompressed and selectively added to the decompressed base image data to form a facsimile which more accurately duplicates the original image than the decompressed base image data alone. The step of generating the detail image data includes the steps of determining an average of Y component signals of a sub-array of pixels, determining an approximate variance of Y component signals of the sub-array, and forming a bit mask wherein each bit in the mask indicates whether the corresponding pixel is greater than or less than the mean. The compression algorithm is optimized for execution on general purpose commodity microprocessors so that it can be executed with reasonable performance on conventional desk-top personal computers without specialized hardware.

6 Claims, 16 Drawing Sheets

| PREDICTOR ERROR RANGE | QUANTIZED PREDICTOR ERROR | HUFFMAN CODED PREDICTOR ERROR | HUFFMAN CODE LENGTH |
|---|---|---|---|
| −255 to −125 | −141 | 10000111 | 8 bits |
| −124 to −95 | −108 | 10000110 | 8 bits |
| −94 to −70 | −81 | 10000101 | 8 bits |
| −69 to −49 | −58 | 10000100 | 8 bits |
| −48 to −32 | −39 | 10001 | 5 bits |
| −31 to −19 | −24 | 1001 | 4 bits |
| −18 to −9 | −13 | 101 | 3 bits |
| −8 to −1 | −4 | 11 | 2 bits |
| 0 to 7 | +3 | 01 | 2 bits |
| 8 to 17 | +12 | 001 | 3 bits |
| 18 to 30 | +23 | 0001 | 4 bits |
| 31 to 47 | +38 | 00001 | 5 bits |
| 48 to 68 | +57 | 10000000 | 8 bits |
| 69 to 93 | +80 | 10000001 | 8 bits |
| 94 to 123 | +107 | 10000010 | 8 bits |
| 124 to 255 | +140 | 10000011 | 8 bits |

METHOD AND APPARATUS FOR COMPRESSION DATA BY GENERATING BASE IMAGE DATA FROM LUMINANCE AND CHROMINANCE COMPONENTS AND DETAIL IMAGE DATA FROM LUMINANCE COMPONENT

This is a continuation of co-pending application Ser. No. 07/823,156 filed on Jan. 21, 1992, now abandoned.

FIELD OF THE INVENTION

This invention relates to the field of data compression and subsequent decompression. More particularly, this invention relates to the field of compressing color image data.

BACKGROUND OF THE INVENTION

Color images are generally represented in a computer environment with an independent color value for each pixel. Each color value must consist of three components in order to represent the full range of colors. Since the display monitors that are used with computers utilize RGB (red, green, and blue) as the three color components, computer images are generally represented using this color format.

Images stored in this format generally require a large data set, but also contain a lot of redundancy because of the lack of randomness in a typical image. If the images are part of a moving sequence of images, as in video, the storage requirements are multiplied by the number of frames. Further, the bandwidth requirements to display a video sequence are much higher than can typically be provided in a low cost computer system. It is often desirable to utilize data compression to reduce data storage and bandwidth requirements- Compression algorithms can take advantage of redundancy in the image and the peculiarities of the human vision system.

Several image compression algorithms have been developed which are reasonably effective at reducing the data storage and bandwidth requirements. However, these algorithms have draw-backs when applied to the personal computer industry and consumer markets. Traditional compression algorithms (such as the JPEG and Px64 ISO standards) use a large number of multiply operations. Without special purpose hardware, multiply operations are not efficient on commodity microprocessors (as are used in personal computers). This inefficiency makes these algorithms impractical for motion video compression on personal computers.

Consumer products are often driven by cost which also precludes the use of specialized hardware to implement compression and decompression algorithms at video rates.

Another aspect of the personal computer industry is the wide range of products that are designed to run the same applications. It is desirable to provide applications and algorithms that can run effectively on low performance as well as high performance personal computers. Since compressed data may be generated on one system and subsequently decompressed on another system, it is desirable to have a simple definition for the compressed data "content" that can be decompressed using any one of a number of algorithms, allowing higher image quality to be achieved when higher computational performance is available. This allows high end personal computers to decompress the same compressed image data as low end personal computers, and achieve higher image quality.

Traditional compression algorithms provide only one algorithm for image decompression. To provide for more than one decompression method, the original image data must be redundantly compressed in different ways and redundantly store resulting in more than one compressed image data set. Under such a scenario, three compression techniques can be used, each reducing the storage size of the original image data by one-half, the resulting storage of the three sets of compressed data would be 50% larger than the original. This defeats the purpose of reducing the data storage requirements.

Thus, an object of the invention is a method to compress color images which results in a compressed image data set that can be decompressed using multiple algorithms to achieve higher image quality when more computational power is applied, and allow for lower image quality when processors with lower computational power is applied.

Another object of the invention is a method to compress and decompress color images that can be implemented efficiently on a commodity microprocessor without a hardware multiply instruction, so that it can run efficiently on personal computers without specialized hardware.

SUMMARY OF THE INVENTION

The present invention is for an image compression algorithm which can be executed efficiently on commodity microprocessors such as those found in personal computers, work stations, and consumer products. The compression algorithm typically reduces data storage requirements to 1 to 2 bits per pixel and can operate fast enough to allow real-time compression of video sequences at reduced resolution.

Further, the compressed image data generated by the compression algorithm can be decompressed by any one of a number of different algorithms, providing different levels of image quality, depending upon the amount of computational power that is available in the machine performing the decompression. This allows the same compressed image data to be decompressed on a wide variety of computers and consumer products. Since this compression/decompression method will most often be used for video sequences, the availability of different decompression algorithms allows video reproduction of the content even on low performance computers, and further allows computers having high performance processors to take advantage of the additional computational power to produce higher quality images.

The compression algorithm is particularly effective at smaller image sizes where the increased high frequency content tends to reduce the efficiency of traditional transform based compression algorithms such as JPEG and Px64.

The compression algorithm of the present invention operates on luminance/chrominance color space data such as YUV rather than RGB color space data. This is because the YUV, and other luminance/chrominance color spaces, allow the compression algorithm to take advantage of certain aspects of the human vision system. Thus, to compress the image, it is first converted to a luminance/chrominance color space such as YUV, if it not already specified in such a color space.

The compression algorithm divides the luminance/chrominance color space data image into a low frequency 'base' image and a high frequency 'detail' image. The separation into these two components is actually done as part of the compression process. The low frequency image is filtered, subsampled, and compressed using a Differential PCM technique with Huffman coded predictor errors. The high frequency image is compressed using a modified absolute moment preserving block truncation coding technique.

To generate the base component, each of the Y, U, and V components are subsampled, both horizontally and vertically, using a 2×2 box filter. The chrominance components, U and V, are further filtered and subsampled using a 1:2:1 gaussian filter. The resulting Y, U, and V subsampled images are coded using a modified Differential PCM technique. A simple last value predictor is used for each component, and the difference between the predicted value and the actual value is quantized and Huffman coded using a fixed coding table.

Additional compression is achieved by noting that the stream of Huffman codes is largely comprised of two bit codes. This is largely due to the low pass filtering performed in the earlier step. Each run of 16 codes in each of the Y, U, and V code streams is packed into one of two formats. If all the codes in the block were two bit codes, then the block is coded with a leading '1' as a flag followed by 16 one bit codes to specify which of the two valid 2 bit Huffman codes is specified. If the block contains any longer codes, the block is coded with a leading '0' as the flag followed by the 16 codes.

In addition to improving the compression ratio, this coding technique also substantially improves decompression efficiency since the 16 bits that were originally two bit codes can now be decoded by loading the 16 bits into a register and using simple shifting techniques to select between one of two sample differentials.

The detail component is generated from a full resolution, luminance only version of the original image. The portions of the image that contain significant high frequency information are coded using a form of block truncation coding.

In block truncation coding, the image is segmented into n×n blocks of pixels, and a two level (one bit) threshold quantizer is independently designed for each block. The threshold and the two reconstruction levels are dependent on the local statistics of the block. The representation of the block consists of an n×n bit map indicating the reconstruction level associated with each pixel along with additional information to reconstruct the two reconstruction levels.

One published block truncation coding algorithm is called absolute moment block truncation coding because the quantizer is designed to preserve the absolute moments of the block. The mean and the first absolute moment of an n×n block are given by the following equations:

$$X = \frac{1}{n^2} \sum_{i=1}^{n^2} X_i$$

$$\alpha = \frac{1}{n^2} \sum_{i=1}^{n^2} |X_i - X|$$

If the quantizer level is set to the block mean, and q to the number of X's the mean, the two reconstruction levels are given by the following equations:

$$a = X - \frac{(n^2\alpha)}{2(n^2 - q)}$$

-continued $$b = X + \frac{(n^2\alpha)}{2q}$$

In the invention, the luminance image is segmented into 2×2 cells of pixels. The quantity $\alpha$ is calculated for each cell, and if a is less than a certain threshold, t, then the cell does not have significant detail (high frequency) information, and is not coded as part of the detail component. Otherwise, the cell is coded and added to the detail component.

The detail cells are coded by creating a four bit map, one bit for each of the pixels in the cell. The bit indicates which of the two reconstruction levels, a and b, will be used when decompressing the image. This is combined with the e quantized to four bits to form the detail byte describing the cell. Note that this byte implicitly defines the quantity q, but does not contain any information about the mean. The mean value of the cell is derived from data in the base image during decompression to create the two reconstruction levels that define the luminance data of the detailed 2×2 cell.

A sparse bit map (one bit for each 2×2 cell) is used to specify which cells are represented in the detail image and which ones have been discarded. The bit map is encoded using a run coding scheme similar to the white block skipping techniques designed for use by facsimile machines. The map is divided into blocks of 8 bits. If the block contains all '0' bits, then the block is coded by a single '0' bit. If the block contains any '1' bits, then the block is coded by a leading '1' bit followed by the eight bits in the block. This approach is effective for data compression given that the detail blocks tend to be relatively rare (5% to 25%) and are generally clustered.

The combination of the sparse bit map along with the detail bytes that were not discarded make up the detail component of the compressed image data set.

There are several ways to decompress the image, depending on the amount of computational power available.

In the simplest case, the base image can be decoded and used at its subsampled resolution, providing a ¼ size version of the original. At this size, the detail component does not add any quality to the image.

If more compute power is available, the base image can be expanded back to its original resolution using either pixel replication, or if more power is available, linear interpolation to calculate intermediate pixel values.

The expanded base image (using either scheme) can be combined with the detail image. The mean value of the block is derived from the data in the base image, and is combined with the detail byte to create the two reconstruction levels described previously that define the luminance data of the detailed 2×2 cell. In the case where linear interpolation is used to create the intermediate pixel values, the base image pixels do not contain the mean, but these values are used in lieu of the mean using the previously defined equations.

These and other objects and features of the present invention will be understood more fully from the following detailed description which should be read in light of the accompanying drawings in which corresponding reference numerals are discussed in the text, and refer to corresponding parts throughout several views.

DETAILED DESCRIPTION OF THE PREFERRED EMBODIMENT

Figure 1:
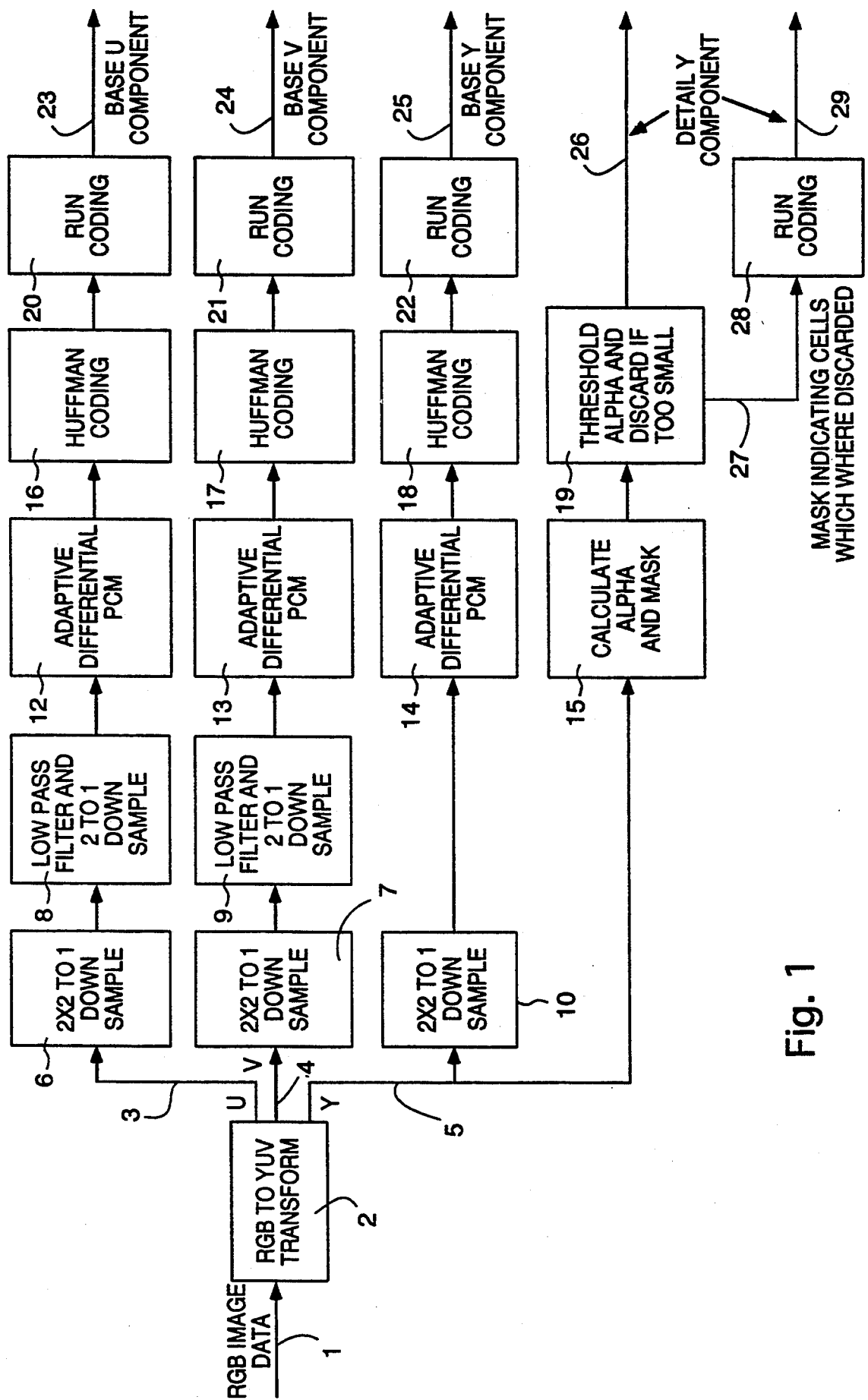
FIG. 1 is a functional representation of the operations performed to compress an RGB image as described in the preferred embodiment.

The preferred embodiment is a software implementation of the operations shown in FIG. 1 and FIG. 2. The algorithms can be executed efficiently on a commodity microprocessor as found in personal computers, or a microprocessor or DSP as may be found in consumer products. Additionally, special purpose hardware can be designed by a person of ordinary skill in the art to implement the present invention.

Image Compression

Referring to FIG. 1, a color image is represented by an array of RGB colors, 1, and is compressed by a number of operations to generate base components, 23, 24 and 25, and detail components, 26 and 29. The base components include three independent parts, a base Y component, 25, a base U component, 23, and a base V component, 24.

The RGB image is contained in memory either as a single array with one long word per pixel, 120, or as three independent arrays, one each for red, green, and blue, each with one byte per pixel.

For each pixel, the RGB color is transformed into YUV color space. The specific transform used can be any one of numerous transforms known in the art. The traditional transform is defined by the following equation.

$$\begin{bmatrix} Y \\ U \\ V \end{bmatrix} = \begin{bmatrix} 0.299 & 0.587 & 0.114 \\ -0.147 & -0.289 & 0.436 \\ 0.615 & -0.515 & -0.199 \end{bmatrix} \begin{bmatrix} R \\ G \\ B \end{bmatrix}$$

However, since this conventional transformation requires a significant number of multiplication steps per pixel, the transformation described in my copending U.S. patent application Ser. No. 07/865,071 filed Apr. 8, 1992 can be used and is substantially more efficient and preferred.

Since the compression algorithm of the present invention can also be used to compress color image data that is already in YUV format, the above described color space transformation, 2, may not be necessary. Further, it will be obvious to one skilled in the art that a totally different color space transformation could be used in lieu of 2 to transform from an arbitrary color space to a color space with chrominance and luminance components.

After the image has been transformed to YUV color space, the algorithm diverges into two paths. One path generates the base components including the three independent parts a base Y component, 25, a base U component, 23, and a base V component, 24. The other path generates the detail components, 26, 29. The generation of the base components is described first.

Generation of Base Components

Figure 5:
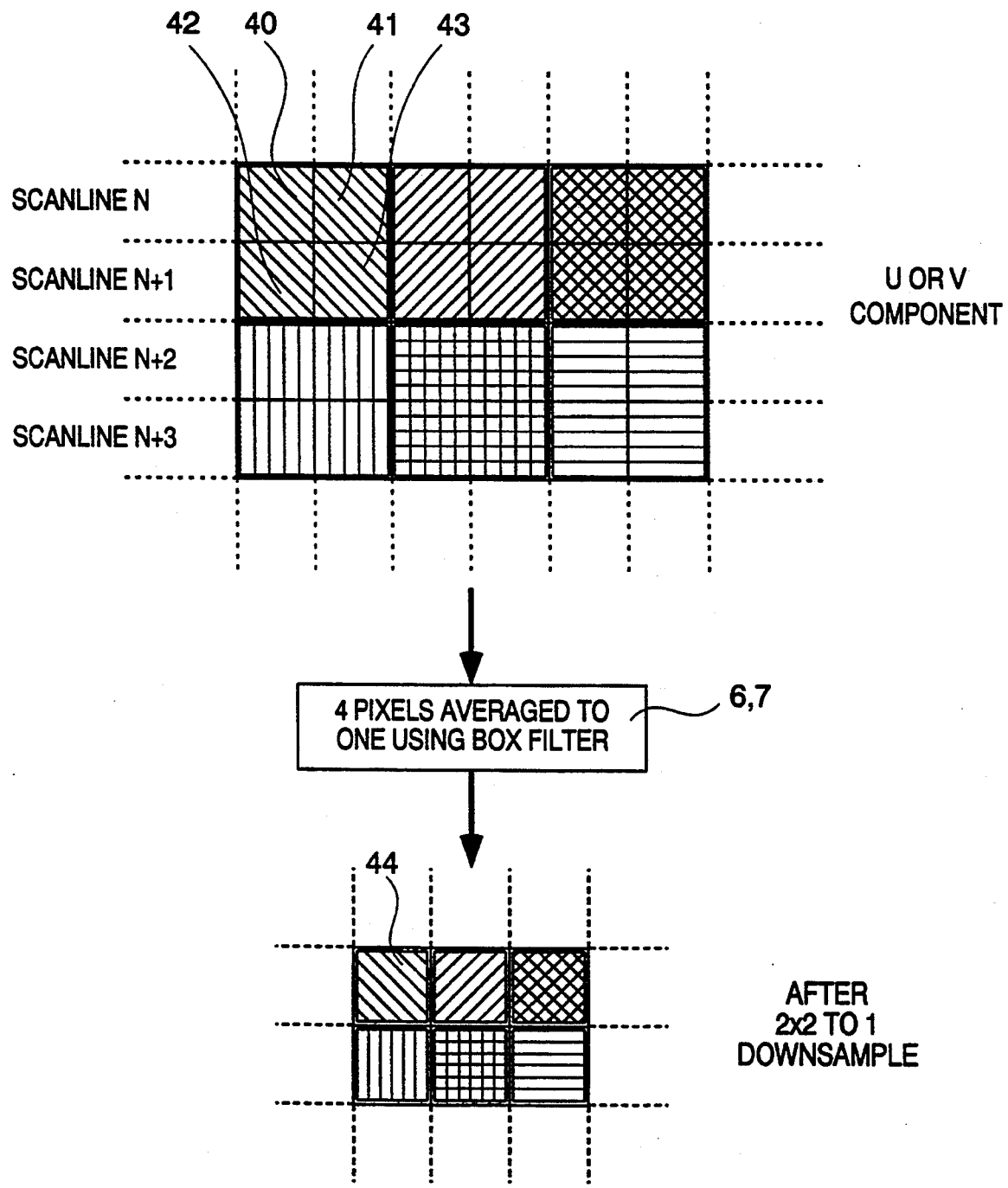
FIG. 5 graphically explains the operation of the 2×2 to 1 down sampling of the Y, U and V color components.

The Y, 5, U, 3, and V, 4, components are each down sampled in the horizontal and vertical direction by averaging two pixels horizontally and two pixels vertically to generate each pixel in the downsampled component image. For example, referring to FIG. 5, pixel values 40, 41, 42, and 43 are added together, then the sum is divided by four (shift right two bits) to generate the pixel 44 in the downsampled image. This same operation is performed on every other group of four pixels for the rest of the Y, U and V component images. In FIG. 5a, six groups of 2×2 pixel arrays are each highlighted with a unique shading pattern. The pixels in the resulting down sampled image of FIG. 5b that are produced by downsampling the highlighted pixels in FIG. 5c are shown using the same unique shading pattern. These six pixel groups are representative of all the pixels in the image.

Although a simple box filter is preferred due to computational simplicity, a more sophisticated filter, such as a two dimensional gaussian filter, could be used to good results, particularly if more computation power is available.

Figures 6, 8:
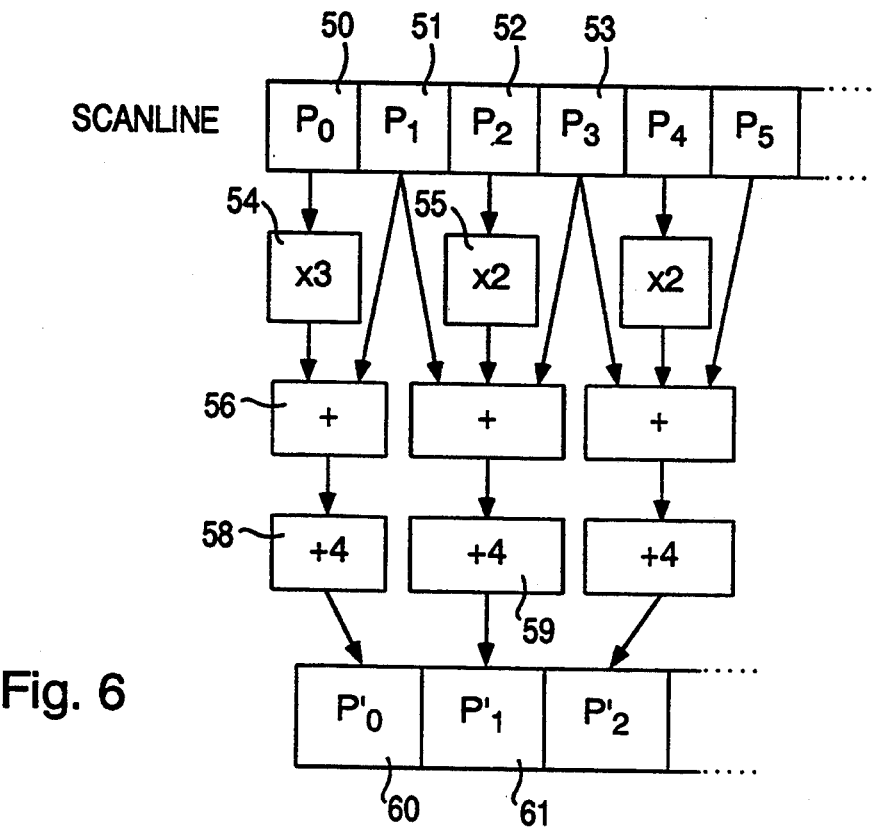
FIG. 6 is a functional representation of the operations performed to low pass filter and down sample the U, and V color components along the scan line as a step toward generating the base component of the compressed data as described in the preferred embodiment.
FIG. 8 describes the contents of the quantizing and Huffman coding table.

After down sampling, the U and V components are filtered and down sampled once again, although in this case a gaussian filter is used, and the filtering and down sampling is down only in the horizontal direction. Referring to FIG. 1, this is shown in 10, 8, and 9 for the Y, U, and V components respectively. Referring to FIG. 6, for each scan line in the image (for U and V), a 1:2:1 gaussian filter is applied to generate a new scan line with half the number of sample points.

The generation of the first output pixel in each scan line, 60, is handled as a special case since this is a boundary condition. The value of $P_0$, 50, is multiplied by three, 54, (by using a left shift and an add operation), and is added, 56, to the value of $P_1$, 51. The result is divided by four (by shifting the result twice to the right), 58, to normalize the range to be the same as the input pixels. The next pixel, 61, and the remainder of the pixels in the scan line are generated by filtering three input pixel values. To calculate $P_1$, 59, the value of pixel $P_2$, 52, is multiplied by two (by shifting left one bit), 55, and added, 57, with the value of $P_1$, 51, and $P_3$, 53. The result is divided by four (by shifting right two bits), 59, to generate the output pixel, 61. It is clear from FIG. 6 how this process is repeated on the remainder of the pixels on each scan line.

For this filtering and down sampling step, the more sophisticated gaussian filter is preferred over a simple box filter. This is because this filtering step is executed only in one dimension and the improvement in image quality justifies the increased computational expense. A more or less sophisticated filtering approach could be used for this step as well for less expensive systems.

Referring back to FIG. 1, after filtering and down sampling, each of the Y, U, and V components is coded using Differential Pulse Code Modulation (DPCM). This is a well known technique to take advantage of the predictability of a non-random input source. Each of the Y, U, and V components are processed independently by the three DPCM blocks 14, 12, and 13 respectively, although the operations performed are identical.

Pulse code modulation (PCM) simply refers to the use of digital samples to represent the analog video signal. This is exactly the way the image data is normally stored in a frame buffer in uncompressed form. Differential PCM means that, instead of storing the actual sample values, each sample value prediction is based on previous sample values, and the difference between the actual value and the predicted value is used as the new DPCM sample. If there is a lot of regularity in the image, the predicted value will be close to the actual value and the DPCM values will be small. This will allow them to be coded efficiently in the next stage of the compression algorithm. The DPCM is extended to include quantization of the predictor errors, to allow them to be coded more efficiently using Huffman coding.

In the preferred embodiment, the prediction is very simple; the predicted value is equal to the previous predicted value minus the quantized error. This approach is currently preferred for computational efficiency. However, a more advanced predictor could also be used, using multiple previous pixel values to estimate the value based on a higher order curve fit.

Figure 7:
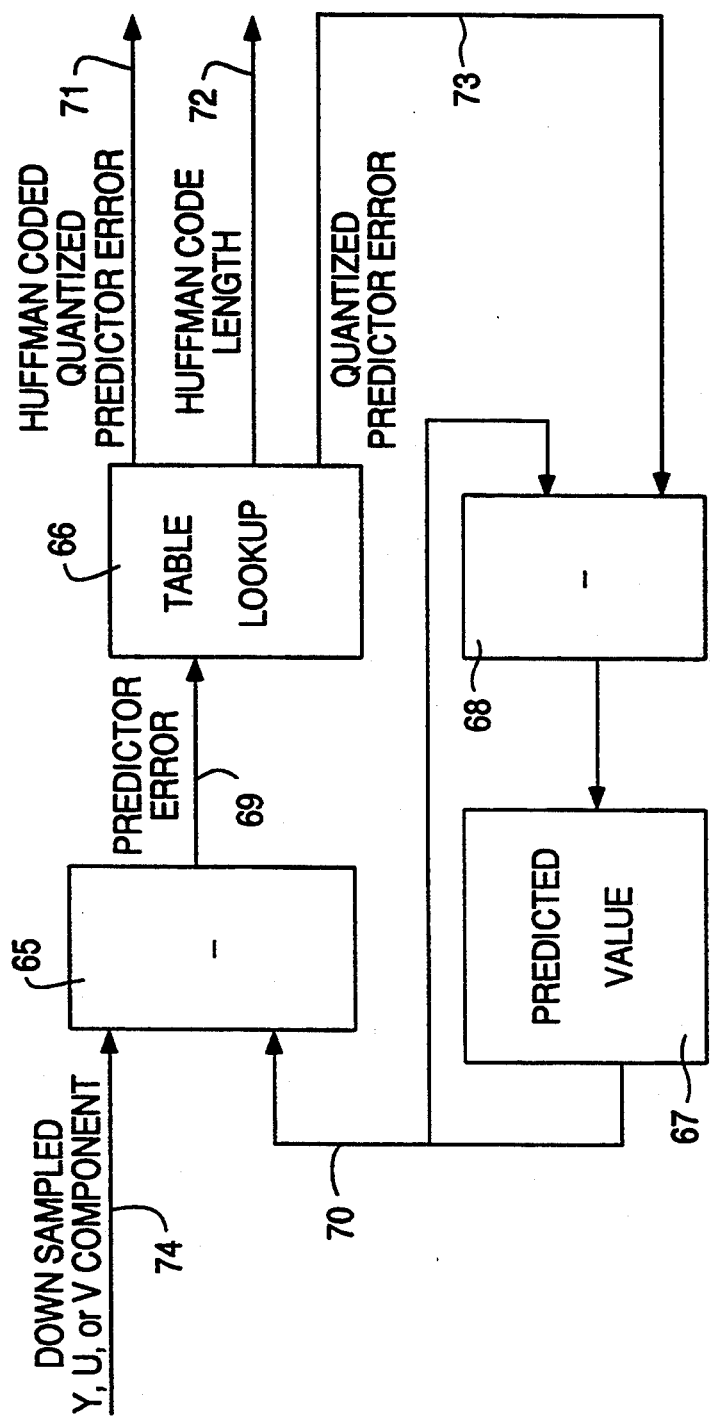
FIG. 7 is a functional representation of the steps taken to generate the Differential PCM codes, and the table look-up to perform quantizing and Huffman coding for the Y, U, and V components in the calculation of the base component of the compressed image data set.

Although the DPCM and Huffman coding are shown as two independent operations, they are implemented more efficiently in the preferred embodiment by calculating them together. Referring to FIG. 7, the Y, U, or V component 74 is subtracted from the predicted value for that component 67 by subtract operation 65. The result 69 is the predictor error and is used to index into a precomputed table 66 to generate the quantized predictor error 73, the Huffman coded quantized predictor error 71, and the length of the Huffman code 72. The predicted value for the next sample 67, is calculated by subtracting the quantized predictor error from the predicted value for the current sample 70.

By using the quantized predictor error to calculate the new predicted value, any error due to the quantizing will not accumulate, but instead will be offset from the next sample calculation.

The contents of the table used to generate the quantized predictor error and the Huffman coded error is shown in FIG. 8. The range of inputs is shown in the left most column. All entries in this range have the same contents as shown by the remaining three columns in the table. The Huffman code length is used to generate the data stream and simplify the coding in the next step of the compression algorithm.

For most images, the sample to sample correlation is very high in the base component and the predictor error is typically in the range of −8 to 7, resulting in a large percentage of two bit Huffman codes. Additional compression is achieved by grouping runs of two bit codes. This is done independently for the Y, U, and V component Huffman code streams. Each run of 16 codes from each of the component streams is packed into one of two formats. If a block of 16 codes is comprised entirely of two bit codes, then it is replaced by 17 bits having a leading '1' and 16 bits, one bit for each of the 16 codes identifying whether the code is '01' or '11'. Otherwise, the block is coded as a leading '0' followed by the 16 codes.

Figure 9:
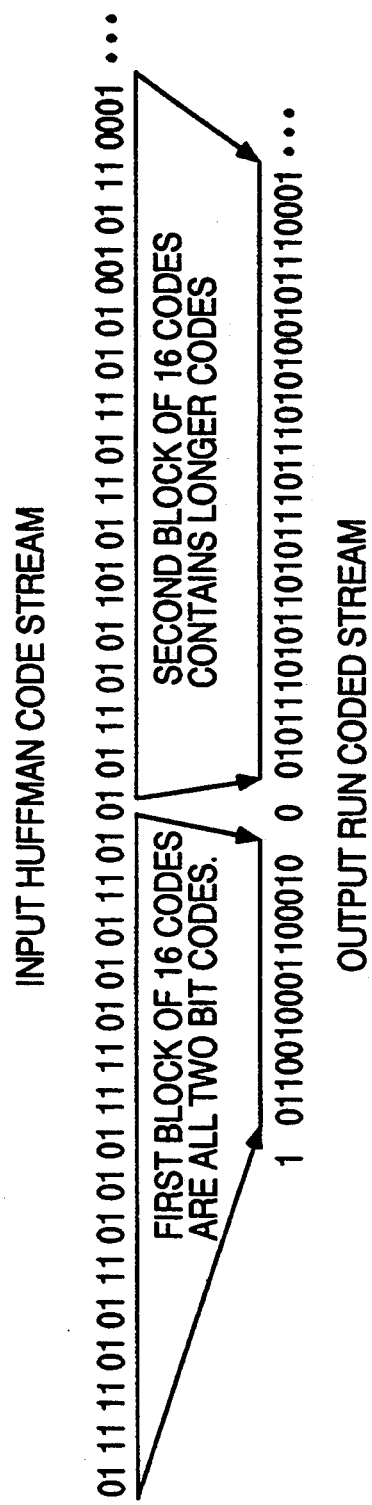
FIG. 9 provides an example of the run coding step performed as the last stage of the compression algorithm to generate the base component of the compressed image data set.

An example of this run coding is provided by FIG. 9. Here, the first block of 16 codes contains all two bit codes and can be further compressed into 16 one bit codes. The second block does not consist of all two bits and is not further compressed.

The output of the run coders, 22, 20, and 21, make up the base Y, U, and V components of the compressed image data set.

Generation of Detail Component

The detail components of the compressed data set is generated in a completely different manner from the base components. Referring to FIG. 1, the detail component is calculated for the Y color component only, and is derived from the full resolution Y component image 5.

Figure 10:
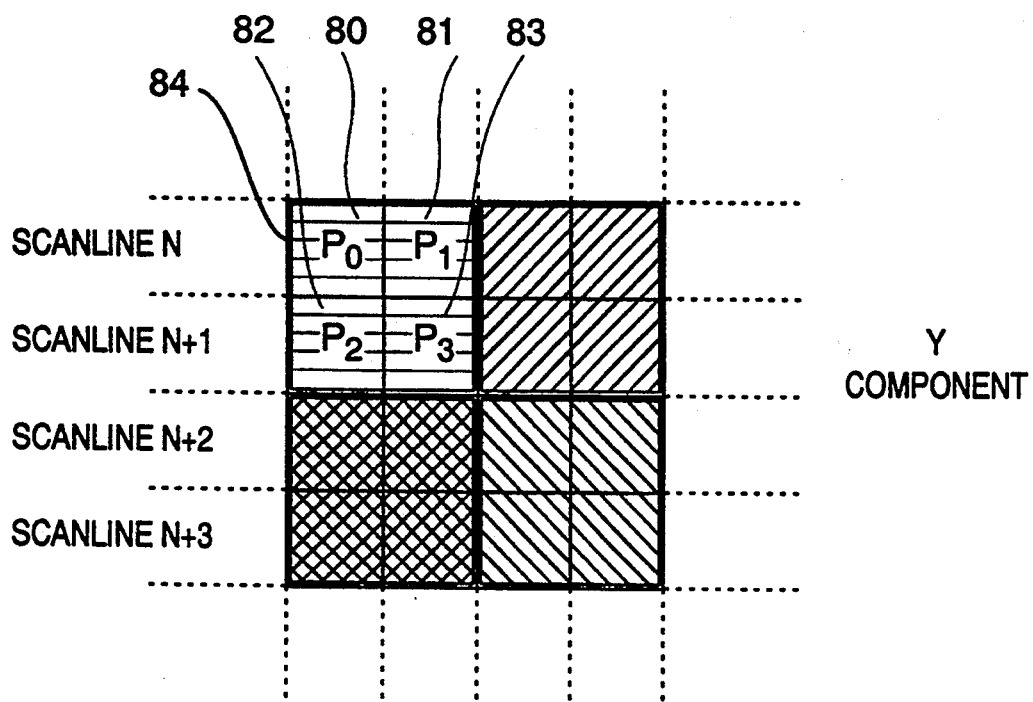
FIG. 10 graphically shows the cell groupings used to calculate the detail component of the compressed image data set.
Figure 11:
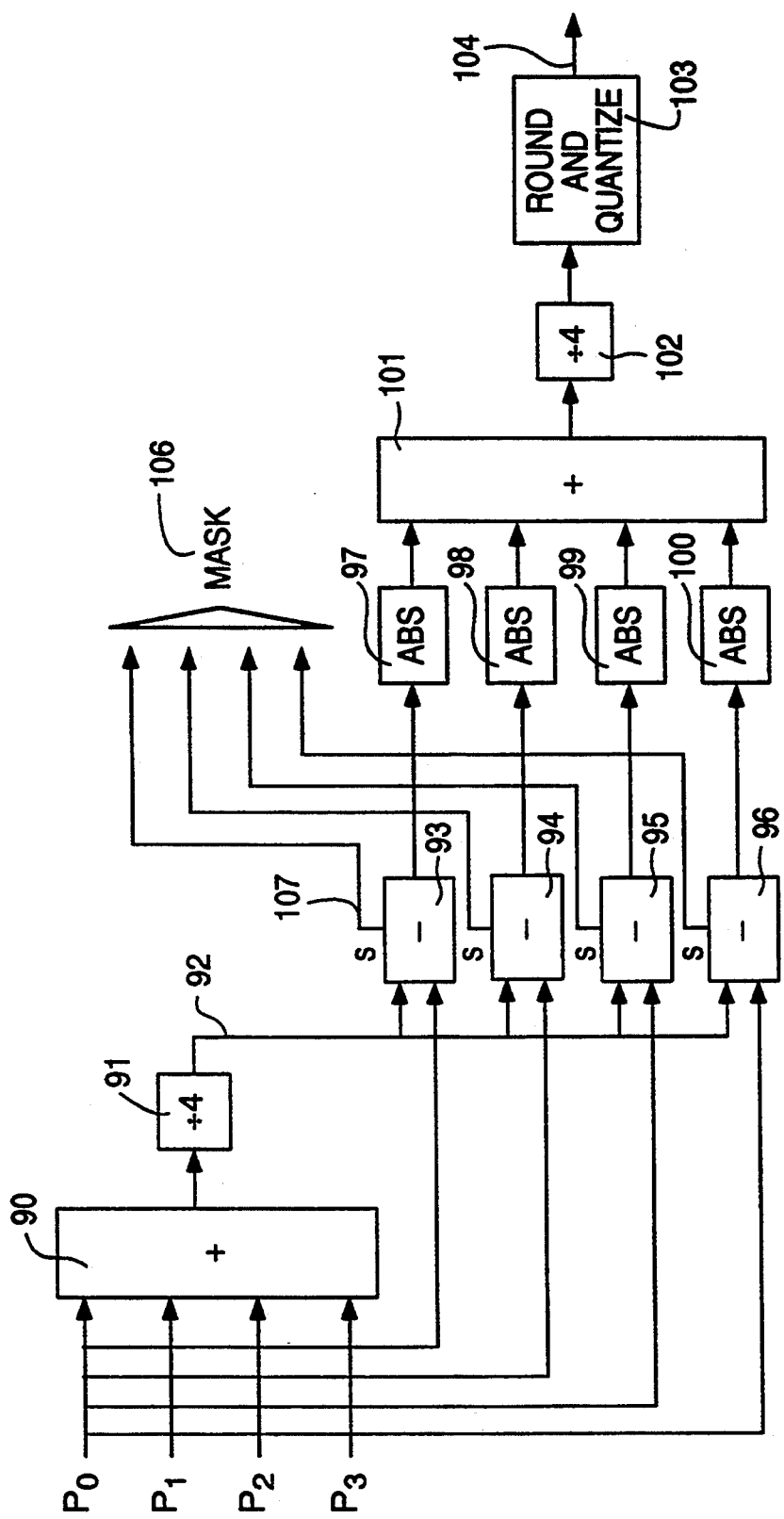
FIG. 11 is a functional representation of the operations performed to generate the quantized alpha value and mask as a step toward computing the detail component of the compressed image data set.

Referring to FIG. 10, the Y component image is grouped into 2×2 pixel cells. For each cell, an approximation of the variance and a mask is calculated. The mask indicates whether the pixel value was greater than or less than the average for the cell. Referring to FIG. 11, the average 92 is computed by adding 90 the values of the Y component of the four pixels, and dividing by four 91. For example, in FIG. 10, the average of the cell in the upper left 84 is calculated by adding the value of pixels $P_0$ 80, $P_1$ 81, $P_2$ 82, and $P_3$ 83, and then shifting the result right two bits. The remainder of the cell averages are computed in a like manner.

Note that if a box filter is used to downsample the Y component 10 during the calculation of the base component of the compressed image, then the average of the cell was calculated for this purpose. In the preferred embodiment, the downsampled Y component image is used for the cell averages to avoid redundant calculations.

For each cell, an approximation of the variance is calculated by averaging the absolute value of the difference between the value of each pixel in the cell and the average of the values of all the pixels in the cell. This approximation is referred to as alpha $\alpha$ 104. Referring to FIG. 11, the pixel value is subtracted from the computed average 92 by the subtract operations 93, 94, 95 and 96. The sign bit 107, labeled S in FIG. 11, from each of the subtract operations is saved as a mask 106. This mask indicates whether the pixel value was greater than or less than the computed average for the cell, 92.

The absolute value 97, 98, 99 and 100, of the result from each of the subtract operations is then averaged to calculate an approximation of the variance, referred to as alpha. This averaging is done by adding 101 the results of the absolute value operations 97–100, and dividing the result by four 102. The divide by four is performed by shifting the result right two bits.

The alpha value is then quantized to four bits 103 to reduce the number of bits required to store it. A rounding operation can be done before quantizing by adding a constant and checking for overflow.

The four bit mask value 106 is combined with the four bit quantized alpha 104 to form a one byte detail component for each cell.

Referring to FIG. 1, a thresholding operation 19 is then performed on the alpha value. If the cell does not contain sufficient high frequency information (as determined by the magnitude of the alpha value), the detail component for the cell is discarded. The four bit alpha component 104 is compared with a threshold value that can be modified to suit the compression requirements. If the alpha value is less than the threshold, the alpha 104 and the mask 106 information for that particular cell is not included in the final detail component of the compressed data set.

A bit mask is generated 27 to indicate whether the detail information for the cell was retained or discarded. Before coding 28 this bit mask 27 contains one bit for each of the 2×2 pixel cells in the image. Since most of the cells will be discarded, the bit mask 27 can be coded to reduce its size.

Referring to FIG. 11, the bit mask 27 is represented as a string of bits describing the cells in normal scan-line order. The bits are grouped into runs of eight bits, for example 110 and 111. A flag bit is provided for each eight bits. The flag bit is set to zero if all eight bits in the group are zero. After run coding 28 the string of bits contains the flag bits and only those bit groups which contained at least one bit that was set In FIG. 11, the first group of eight bits 110 is not all zeros, so the flag bit 112 is set and the eight bits are retained in the output bit stream. The second group of eight 111 is all zeros. The output bit stream therefore contains only the flag bit 113 and none of the eight bits from the bit mask. The next bit in the output stream is the flag bit from the next group of eight.

The detail component of the compressed data set, then, contains two parts the coded bit mask 29 just described, and an eight bit alpha/mask combination 26 for each cell in the image represented by a one in the bit mask 27 before coding.

Image Decompression

The image decompression algorithms are shown in FIG. 2 (a–e). A total of five different levels of decompression are described. Each of these is described below, building on the simpler ones.

Base Component Decompression at Half Resolution

Figure 2A:
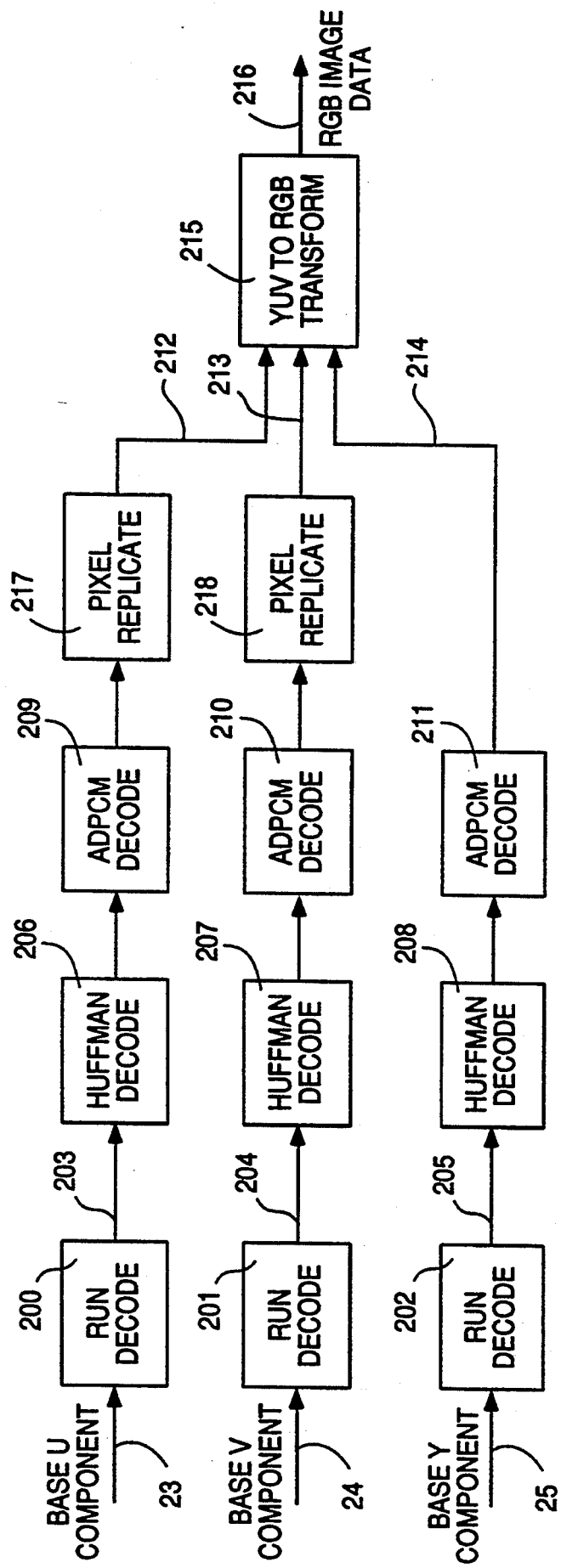
FIGS. 2 (a-e) are functional representations of the operations performed to decompress an RGB image as described in the preferred embodiment. Five decompression algorithms are described.

FIG. 2a is the simplest algorithm and will typically be executed on low performance computers. This algorithm uses only the base component of the compressed image data set.

Referring to FIG. 2a, the Y, U, and V components, 25, 23, and 24, are processed during decompression in the same manner as each other. In the compressed image data set, each component is stored in a run encoded format. The first step in the decompression algorithm is to expand the data to a string of Huffman coded differential sample values. In FIG. 2a, this is done by run decode blocks 200, 201, and 202. Each of the Y, U, and V components is parsed as a serial bit stream. A flag bit at the beginning of each 16 sample values indicates whether all the sample values in the group were coded as two bit Huffman codes. If the flag bit is one, the run encoded sample value group contains only one bit for each sample indicating, for each sample, which of the two valid 2-bit Huffman codes defines that particular sample. In this case, the run decoding and Huffman decoding is implemented as a single operation. A functional representation of this operation is shown in FIG. 13.

Figure 13:
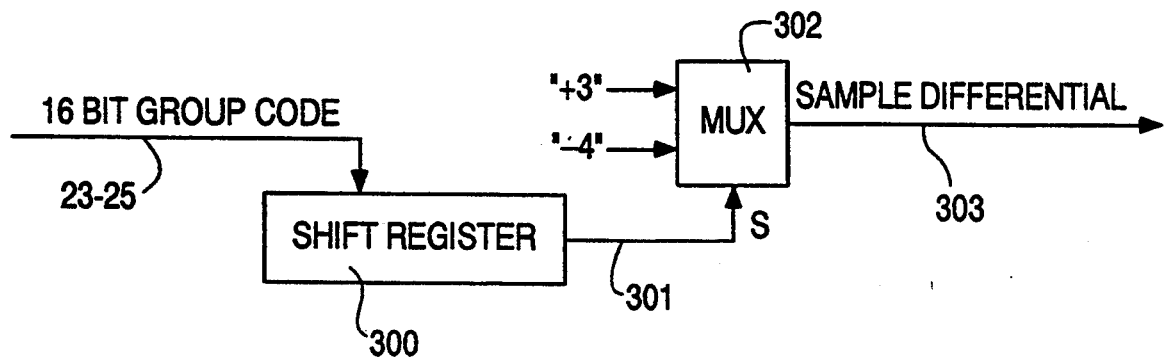
FIG. 13 is a functional representation of the operations performed to decode the run coded Huffman codes for groups containing only two bit Huffman codes.

Referring to FIG. 13, the 16 bit code from the one of the Y, U, V components 23, 24 and 25, is loaded into shift register 300. The code is shifted out of the register 300 and the serial output 301 is used to select a +3 if the bit was a zero, or a −4 if the bit was a one using the multiplexor 302. These values are the quantized predictor error values which are represented by Huffman codes 01 and 11 respectively. The selected value 303 is the Huffman decoded value for the sample differential.

If the flag bit for the sixteen codes is zero, this indicates that the block of sixteen codes had at least one code that was not a two bit Huffman code. In this case, the full Huffman code is contained in the code stream and must be decoded. The run decoder simply strips off the flag bit and passes the codes to the Huffman decoder.

Figure 14:
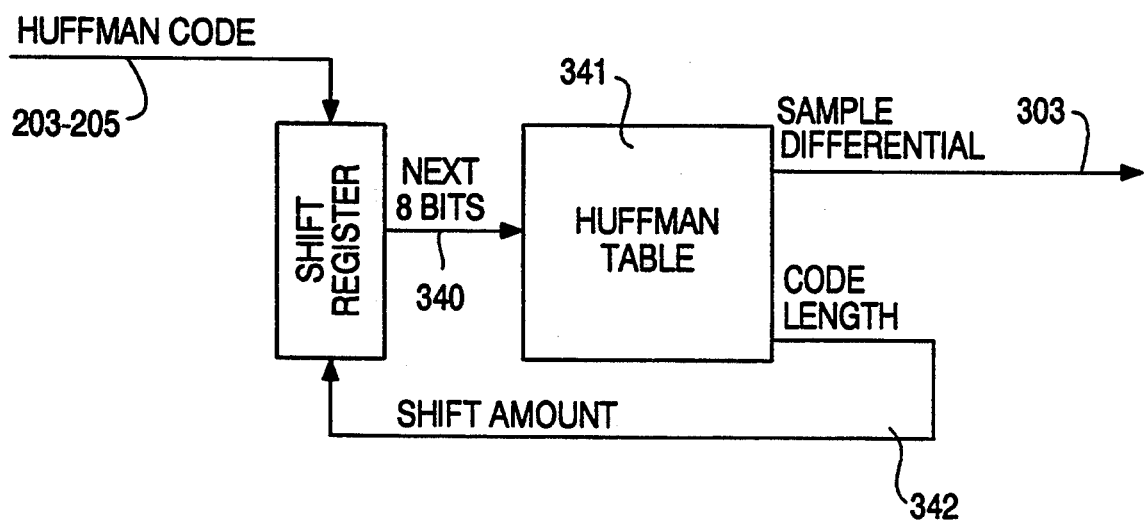
FIG. 14 is a functional representation of the Huffman decode using a table look-up.

The Huffman decoders, 206, 207 and 208, convert the Huffman codes to sample differentials. In the preferred embodiment, this is done with a table look-up. Referring to FIG. 14, the Huffman codes 203, 204 and 205, are shifted into their respective shift registers to allow the next eight bits to be used as an index 340 to a table 341. The table contains the sample differential 303 and the length of the Huffman code 342. This code length is used to advance the bit pointer to the next valid code.

Figure 15:
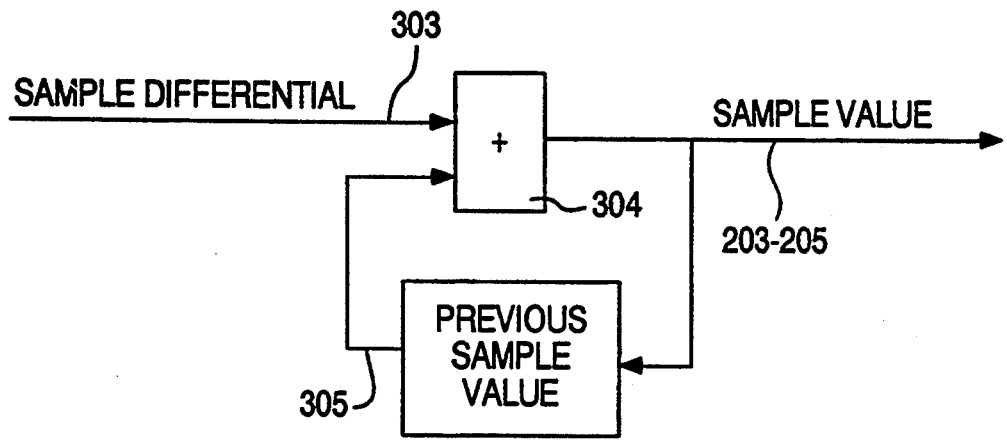
FIG. 15 is a functional representation of the operations performed to convert the differential value after huffman decoding for each of the Y, U, and V components into a sample value.

The next step is calculating the sample value from the differential which is accomplished by the DPCM decode functions 209, 210 and 211 in FIG. 2. The functional representation of this simple step is shown in FIG. 15. The differential 303 is added to the previous sample value 305 to generate the new value for one of the three color components 203, 204 and 205.

The chrominance components, U and V are at half of the horizontal resolution of the luminance component. In this simplest decoding method, the U and V components are pixel replicated in the horizontal direction 217 and 218 by using each value from the DPCM decode for two horizontally contiguous pixels in the output image. In the preferred embodiment, a new image is not actually formed. Instead, each U and V component sample is used twice for the next stage in the decompression algorithm, which for this decoding method is the YUV to RGB conversion.

The Y, U, and V components 214, 212 and 213 respectively, are transformed in to RGB by using an inverse transform 215 from the one used to transform to YUV, 2 in the compression algorithm. An example of such a transformation is shown by the equation below.

$$\begin{bmatrix} R \\ G \\ B \end{bmatrix} = \begin{bmatrix} 1 & 0 & 1.140 \\ 1 & -0.395 & -0.581 \\ 1 & 2.032 & 0 \end{bmatrix} \begin{bmatrix} Y \\ U \\ V \end{bmatrix}$$

However, since this conventional transformation requires a significant number of multiples per pixel, the transformation described in copending U.S. Patent application (filed herewith) is substantially more efficient and preferred.

Since this decompression algorithm may also be used to decompress color image data to another color space, such as directly to YUV, the above described color space transformation 215 may not be necessary. Further, a totally different color space transformation could be used in lieu of 215 to transform from YUV or another color space with chrominance and luminance components to an arbitrary color space. This statement also applies to the remainder of the decompression algorithms described below.

The YUV to RGB transformation produces a decompressed image that has half of the resolution in both the horizontal and vertical axes from the original. This decompression algorithm may be appropriate for implementation on an inexpensive low end personal computers and low cost consumer products.

Pixel Replicated Decompression of Base Component

Figure 2B:
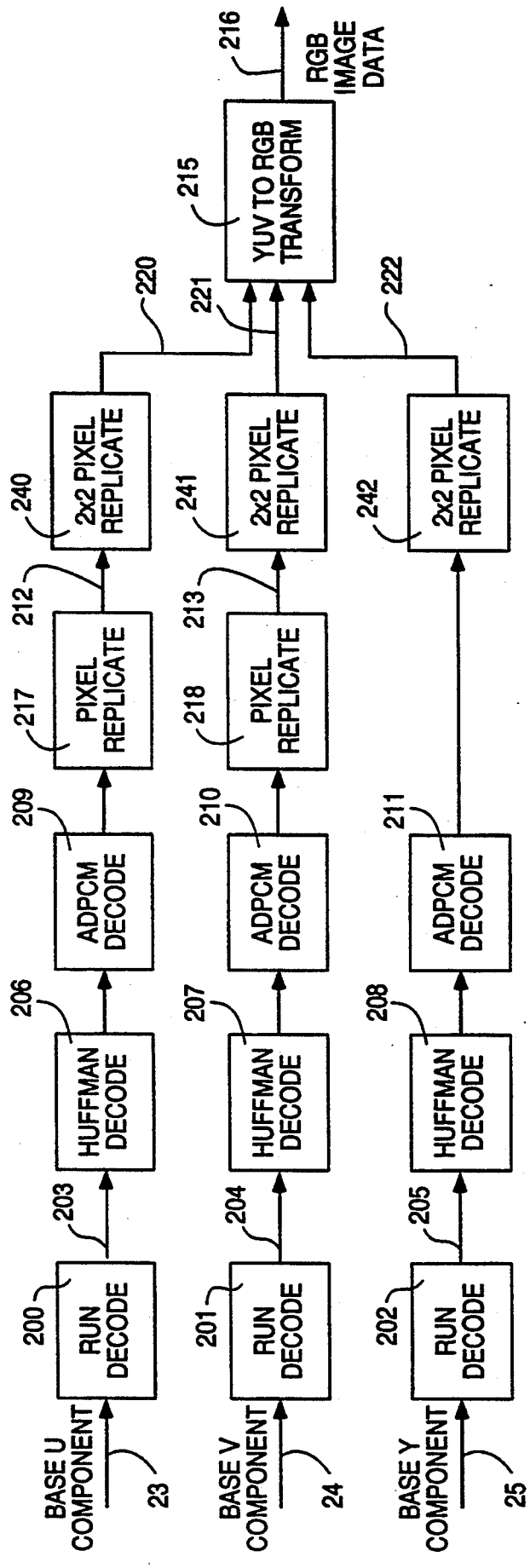

Another decompression algorithm is shown in FIG. 2b. This algorithm produces an image at the full resolution of the original image. This algorithm follows the same steps as the previous decompression algorithm shown in FIG. 2a, but has added pixel replication stages 240, 241 and 242 before the YUV to RGB transformation. This stage replicates the YUV components in both the horizontal and vertical direction.

This algorithm requires slightly more computational power than the algorithm shown in FIG. 2a, and therefore is more appropriate for personal computers and consumer products which have slightly higher computational power, or where the additional image size is important.

This added pixel replication stage can be placed after the YUV to RGB conversion as well. This would reduce the number of color space transformations that would need to be done. However, in some preferred embodiments, the YUV information is converted directly to a color index for a pseudo-color frame buffer (as described in copending U.S. patent application, filed herewith) instead of being converted to RGB. In this case, the pixel replication must be accomplished in YUV color space.

Pixel Interpolated Decompression of Base Component

Figure 2C:
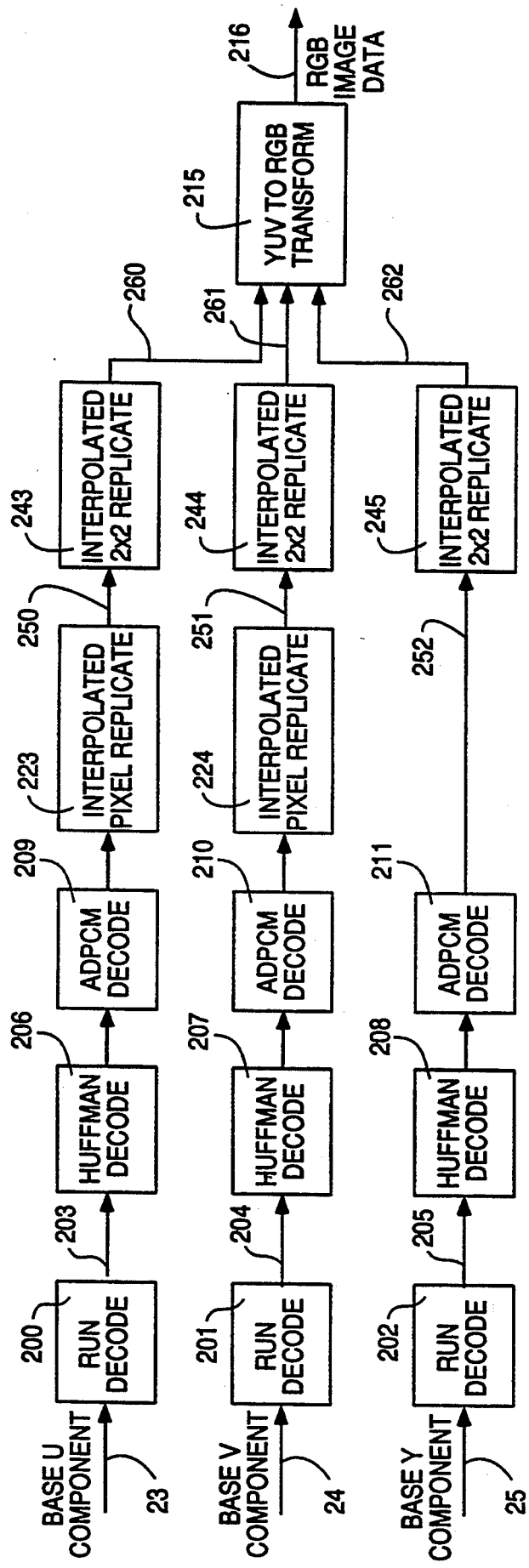

The decompression algorithm shown in FIG. 2c provides improved image quality over the previously described algorithm shown in FIG. 2b. In FIG. 2c, the pixel replication steps 217, 218, 240, 241 and 242, are replaced with pixel interpolation steps 223, 224, 243, 244 and 245. This reduces the blockiness in the resulting image by calculating the value of the inserted pixels by interpolating between neighboring pixels.

In function blocks 223 and 224, two pixels are generated for each input pixel along the scan line for the U and V components. The value assigned the new pixel is equal to the average of the two neighboring pixels. The last pixel on the scan line is treated as a special case and is assigned the same value as the last input pixel.

Figure 16:
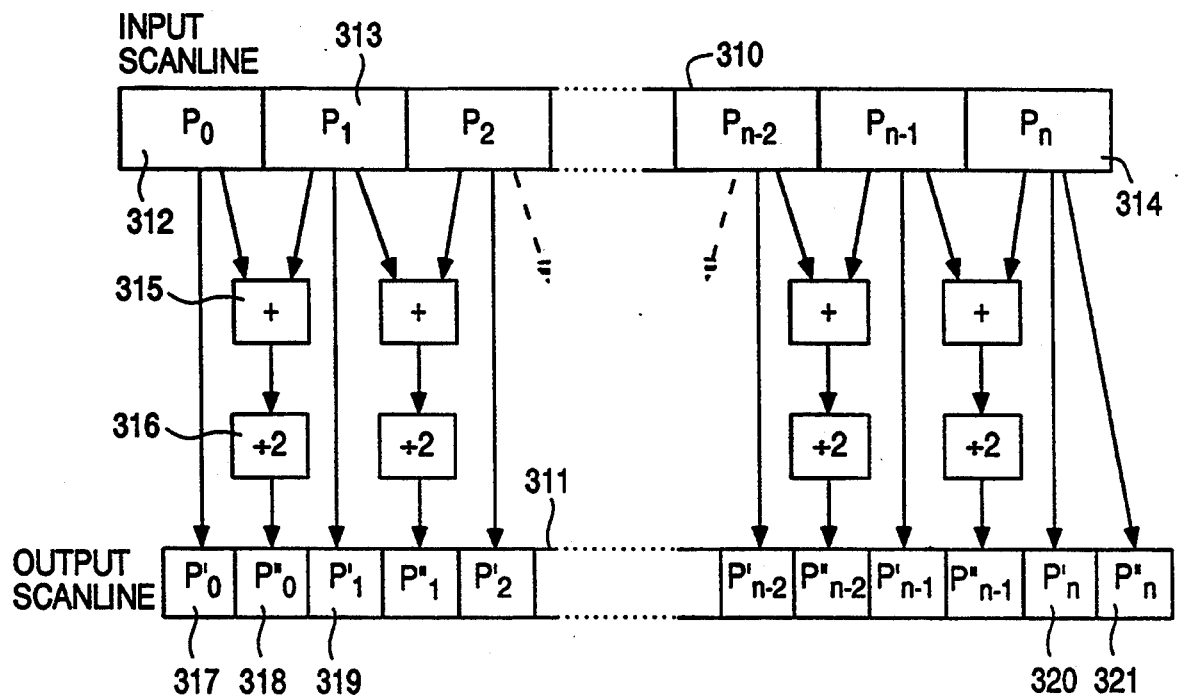
FIG. 16 is a functional representation of the operations performed to interpolate between pixels along a scan line to generate a new scan line with twice the number of sample points.

FIG. 16 provides a functional representation of the interpolation. For each pixel in the input stream 310 $P_0$, $P_1$, etc., two pixels are generated in the output stream 311 $P'_0$, $P''_0$, $P'_1$, $P''_1$. Referring to FIG. 16, $P'_0$ 317 is assigned the same value as $P_0$ 312. The next pixel, $P''_0$ 318, is generated by averaging $P_0$ 312 and its neighbor $P_1$ 313. The average is calculated by adding the values using add operation 315 and dividing the result by two 316. As shown in FIG. 16, the remaining pixel values are calculated in a like manner except for the last pixel 321. This last pixel, $P''_n$ 321, is simply assigned the value of the last input pixel $P_n$ 314.

Figure 17:
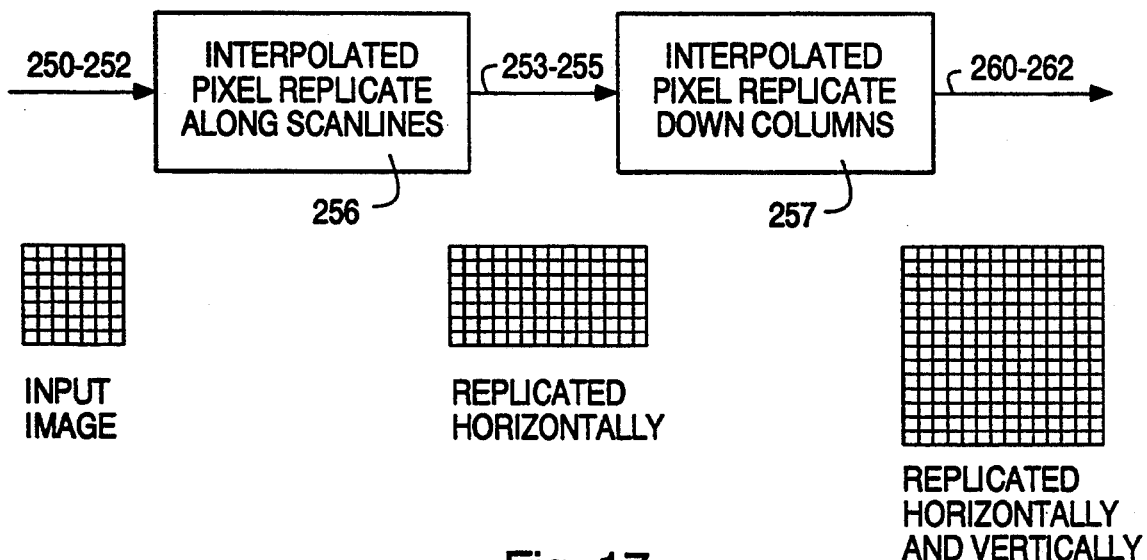
FIG. 17 describes how the one dimensional interpolator for interpolating intermediate sample points can be used twice to perform two dimensional interpolation.

Referring to FIG. 2c, the 2×2 pixel interpolated replication 243, 244 and 245 is performed in the same manner as the scan line replication, except that it is done in two passes. This is shown in FIG. 17. Referring to FIG. 17, the pixels along each scan line are interpolated 256 to double the horizontal resolution. This new image, 253, 254 and 255 is interpolated again and pixel replicated using the same algorithm as shown in FIG. 16, but now in the vertical direction 257. The resulting image 260, 261 and 262 is now at the same resolution as original image before compression.

This new image can now be transformed to RGB 215 as described for the previous decompression algorithms.

This algorithm requires somewhat more computational power than the previous algorithms, but results in a higher quality image at the original image size. This approach may be applicable to so called mid range personal computers and consumer products.

Decompression Utilizing Detail Component with Pixel Replicated Base

Figure 2D:
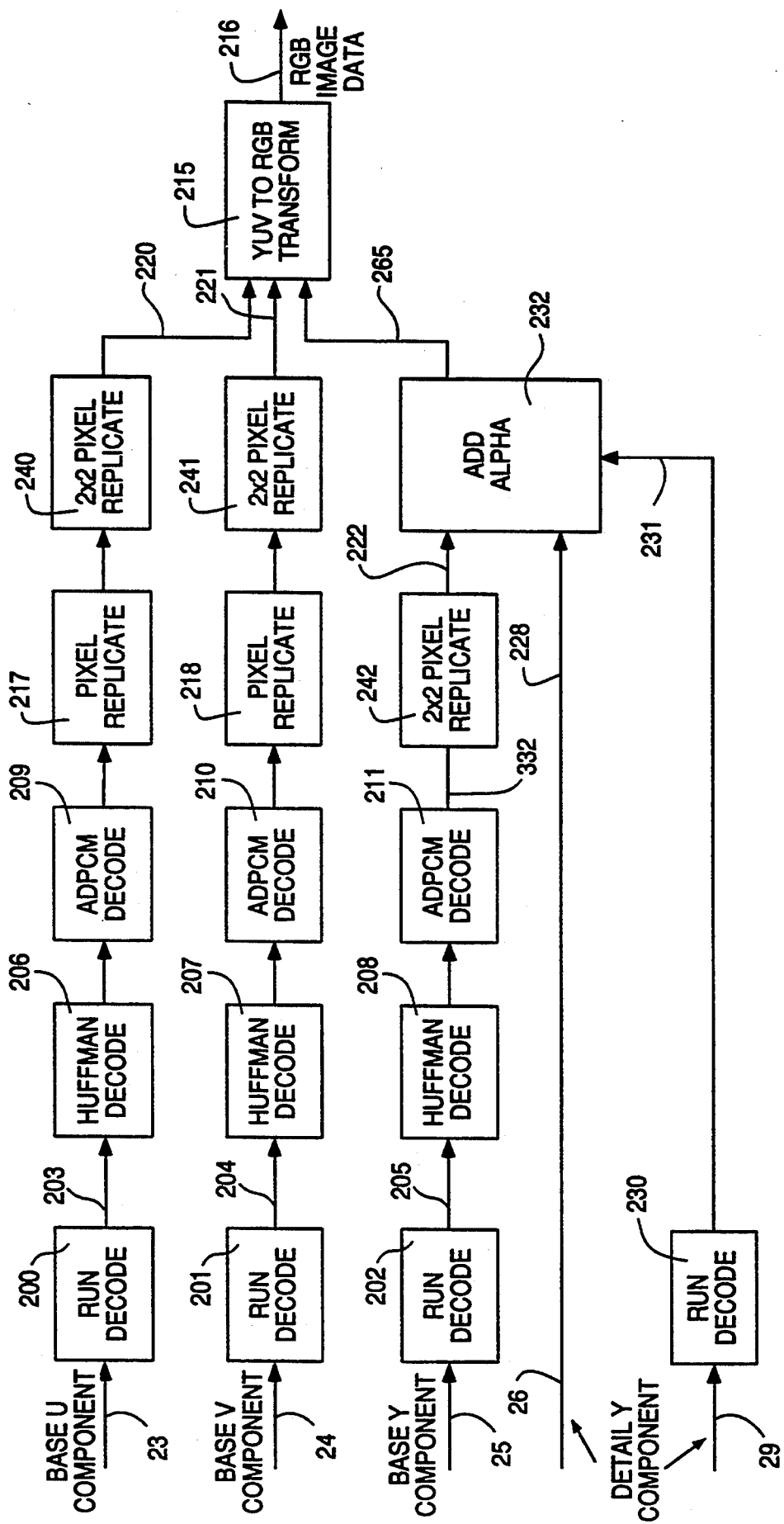

The decompression algorithm described in FIG. 2d results in higher quality image reconstruction, particularly if the original image contained significant high frequency information. This algorithm is essentially the same as the algorithm described by FIG. 2b, except that the Y component is improved by adding in detail information contained in the detail component of the compressed image data set.

Referring to FIG. 2b, the output of the 2×2 pixel replicate of the Y component 222 is used directly in the YUV to RGB color space transformation 215. Referring to FIG. 2d, this algorithm is modified by adding a step in the Y image computation referred to as add alpha 232. This will be described below.

The detail component consists of two parts, an array of bytes which describe the alpha component and mask for some of the 2×2 pixel cells in the image 26, and a run coded bit mask which indicates for which cells in the image the alpha and mask information is provided 29.

Figure 12:
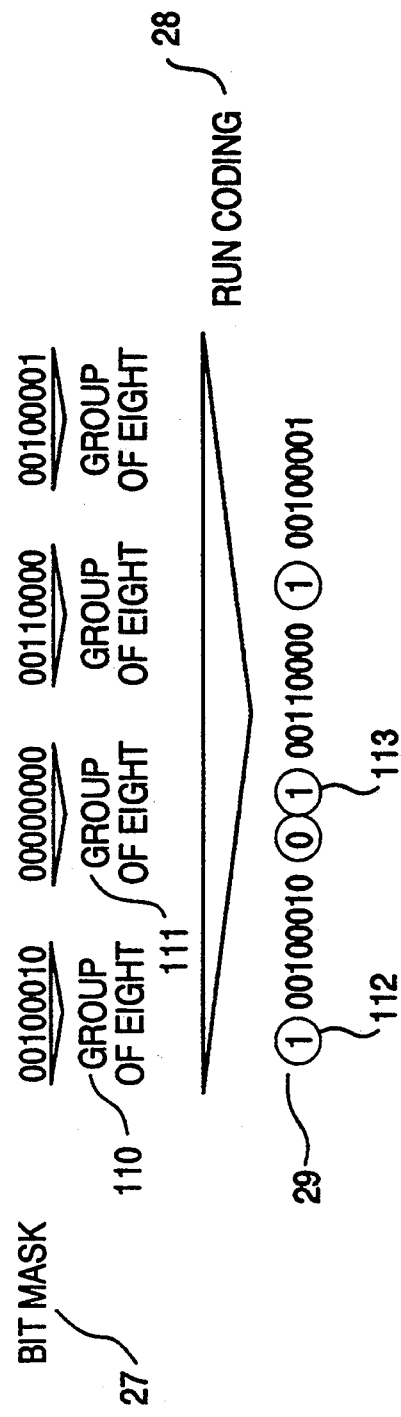
FIG. 12 shows an example of the run coding used to compress the bit mask describing the detail component of the compressed data set.

As described as part of the compression algorithm, the run coded bit map 29 has groups containing a one bit flag, and either zero or eight bits of bit map information. If the flag is zero, the eight bits were zero in the original uncompressed bit map and are not included in the coded bit map. If the flag is one, the eight bits are provided. FIG. 12 shows the coding process to generate the run coded bit mask. The decoding process is simply the reverse.

Referring the FIG. 2d, the decoded bit map 231 contains one bit for each 2×2 pixel cell in the reconstructed image. This can be better understood by referring back to the description of the compression algorithm and the explanation of the creation of the detail component. FIG. 10 provides an example of the how the pixels in the image are grouped into 2×2 pixel cells.

For each bit in the decoded bit mask that is a one, the alpha/mask array contains additional detail information for the corresponding cell. Each entry in the alpha/mask array has eight bits. Four of these bits define a mask which indicates whether the original pixel value was greater or less than the mean of the four pixels that make up the cell. During decompression, this mask is used to determine whether the Y component for each pixel should be increased or decreased. The amount of increase or decrease is determined by the number of pixels above and below the mean (determined by the mask) and the alpha value which is contained in the other four bits of the alpha/mask array entry. As previously described, alpha is a quantized approximation of the variance of the four pixels.

Figure 18:
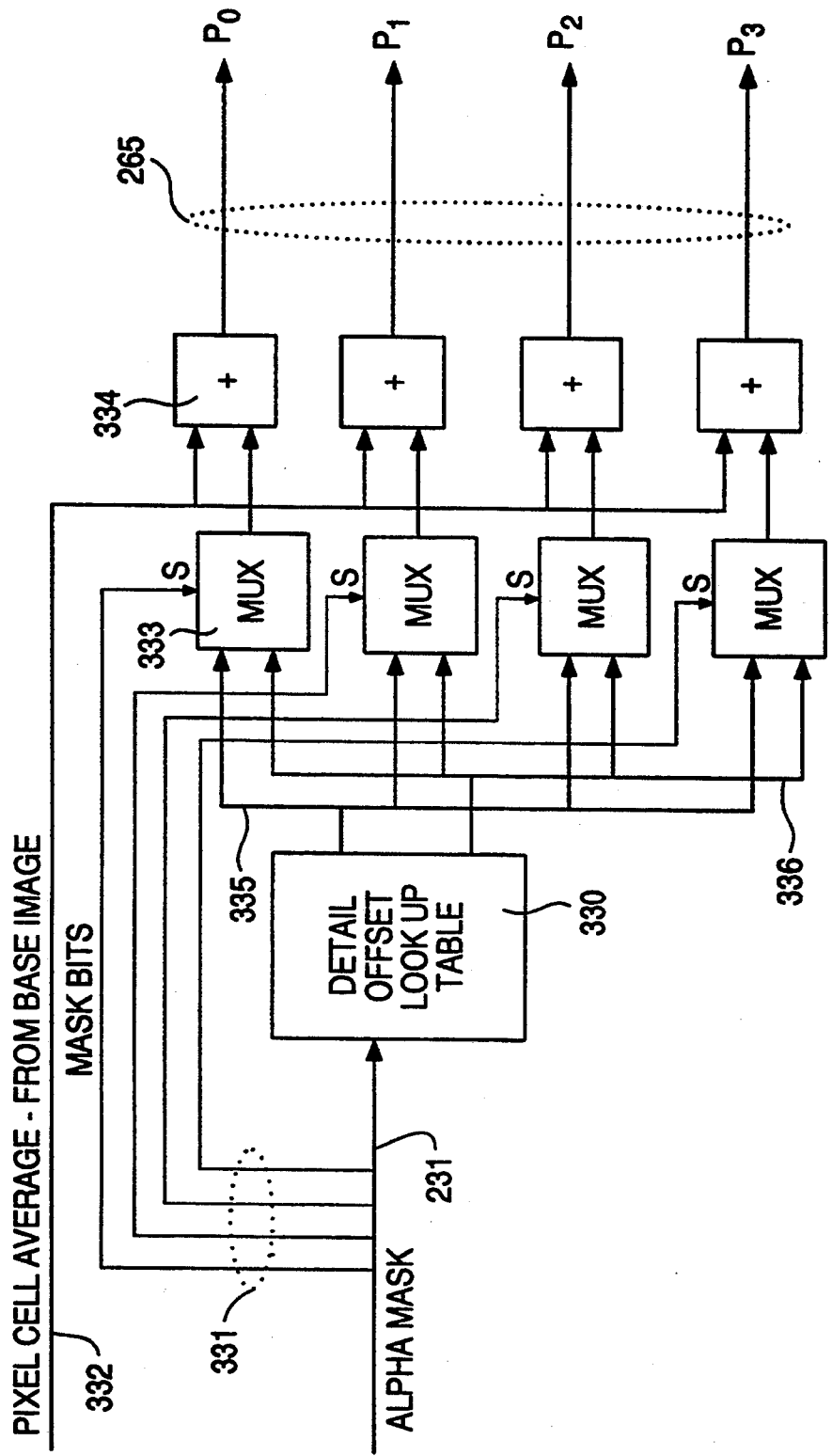
FIG. 18 is a functional representation of the operations performed to decode the alpha/mask detail byte and add the detail information to the base image.

FIG. 18 describes the add alpha block 232 in FIG. 2d. Referring to FIG. 18, the alpha/mask byte is used as the index into a table, which contains the two offsets to be added to the average for the cell 332 to generate the four output pixel luminance components 265. For example, for the first pixel $P_0$ in 265 the mux 333 selects table output 335 if the mask bit in 331 indicates that the original value of the pixel was less than the average value for the cell, and selects 336 if otherwise. The selected value is then added to the average for the cell by 334.

Since the base value for the four pixels in the cell are the same, the diagram in FIG. 18 shows only one input 332 instead of separate inputs for the four pixels 222 as is indicated in FIG. 2d. The pixel replication is actually performed by adding four values to the average 332. However, the final result is the same whether the pixel replication is done first or during the add alpha operation.

The data for the look-up table 330 is derived from the following equations. There are two outputs of the table, designated a and b in the equations. a is selected if the mask bit indicates that the original luminance value for the pixel was less than the average for the cell. b is selected otherwise.

$$a = -4 * alpha/2 * (4-q)$$

$$b = 4 * alpha/2 * q$$

In these equations, q is equal to the number of mask bits set. These equations improve the accuracy of the detail component. If three pixels are on one side of the average and the fourth is on the other side, the three pixels will be three times closer to the average than the fourth.

The result of adding in the detail component is a significant improvement in the accuracy of the high frequency information in the image. This is particularly important for images with a lot of sharp edges. However, since this algorithm uses more computational resources than the previous algorithms, it is more appropriately used on high performance personal computers and consumer products.

Decompression Utilizing Detail Component with Pixel Interpolated Base

This is the final decompression algorithm described, and it provides the highest image quality, but requires the highest computational resources. This algorithm is described by FIG. 2e. This algorithm is a combination of the algorithm described by FIG. 2c and FIG. 2d.

Figure 2E:
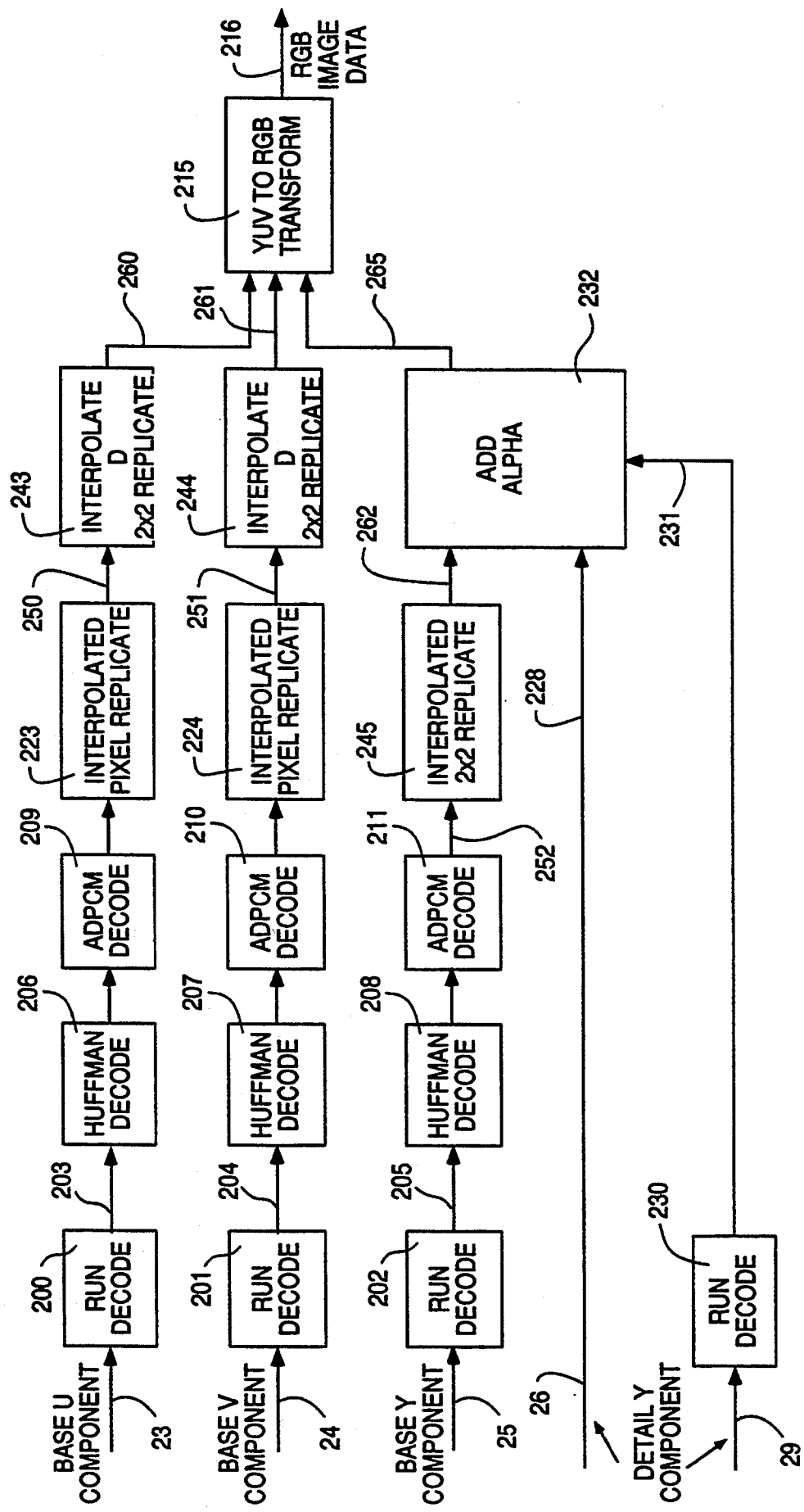
Figure 3:
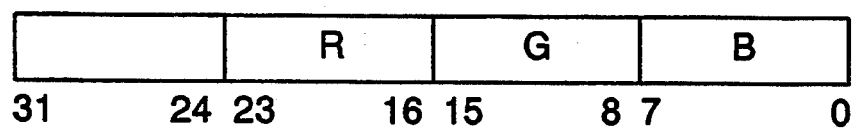
FIG. 3 shows the data format for the RGB color data input to the compression algorithm and output from the decompression algorithm, when the data is stored in an RGB blocked format.
Figure 4:
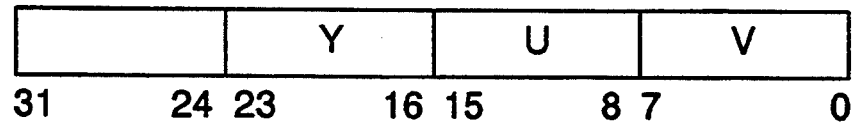
FIG. 4 shows the data format for the YUV color data that results from the RGB to YUV transformation, when the data is stored in a YUV blocked format.

This decompression algorithm can be understood by looking at the diagram in FIG. 2e and reviewing the discussion of the algorithms described by FIGS. 2c and 2d. As with the change from the algorithm described by FIG. 2b to the one described by FIG. 2c, the pixel replication steps in the algorithm described by FIG. 2d are replaced by pixel interpolation steps.

The add alpha block 232 in FIG. 2e performs the same function as in FIG. 2e, although the description in FIG. 18 is slightly different. FIG. 18 assumes that the base component pixel value for the four pixels was the same and showed only one pixel input 332. In this algorithm, the pixel values for the four pixels are different. In this case, the add alpha block 232 simply adds the selected output from the look-up table 330 to each of the four luminance values from the base pixel array 262.

General

Although the operations required to implement these algorithms have been represented as independent functional blocks, these operations can also be accomplished in a sequential manner on a commodity microprocessor such as those found in low cost desk top personal computers. Further, these operations can be implemented in specialized hardware and performed in a parallel or pipelined fashion if very high performance is required. Additionally, these algorithms can be implemented by performing each operation on the entire image before the next operation, or by performing all operations on each pixel before the next pixel, or some combination. Lastly, the Y, U, and V components can be processed together, or one at a time.

While the foregoing invention has been described with reference to its preferred embodiments, various modifications and alterations will occur to those skilled in the art. All such modifications and alterations are intended to fall within the scope of the appended claims.

What is claimed is:

1. A method of compressing display data for YUV color image data representing an original image including a Y component, a U component and a V component, the method comprising the steps of:

(a) generating a base image data containing low frequency image information wherein the base image data is a function of the Y component, the U component and the V component; and (b) generating a detail image data containing high frequency image information wherein the detail image data is a function of the Y component alone, whereby the base image data can be decompressed to form a decompressed base image data that is an approximate facsimile of the original image and the detail image data can be decompressed and selectively added to said decompressed base image data to form a facsimile which more accurately duplicates the original image than the decompressed base image data alone, wherein step (b) comprises the steps of:

a) determining an average of Y component signals of a c×d sub-array of pixels;

b) determining an approximate variance of Y component signals of the c×d sub-array of pixels; and c) forming a c×d bit mask wherein each bit in the mask indicates whether the corresponding pixel is greater than or less than the mean.

2. The method according to claim 1 wherein the detail information is discarded for c×d sub-arrays having an approximate variance less than a predetermined threshold.

3. The method according to claim 2 wherein the threshold is programmable.

4. An apparatus for compressing display data for YUV color image data representing an original image including a Y component, a U component and a V component, comprising:

(a) means for generating a base image data containing low frequency image information wherein the base image data is a function of the Y component, the U component and the V component; and (b) means for generating a detail image data containing high frequency image information wherein the detail image data is a function of the Y component alone, whereby the base image data can be decompressed to form a decompressed base image data that is an approximate facsimile of the original image and the detail image data can be decompressed and selectively added to said decompressed base image data to form a facsimile which more accurately duplicates the original image than the decompressed base image data alone, wherein the means for generating the detail image data comprises:

means for determining an average of Y component signals of a c×d sub-array of pixels;

means for determining an approximate variance of Y components signals of the c×d sub-array of pixels; and means for forming a c×d bit mask wherein each bit in the mask indicates whether the corresponding pixel is greater than or less than the mean.

5. The apparatus according to claim 4 wherein the detail information is discarded for c×d sub-arrays having an approximate variance less than a predetermined threshold.

6. The apparatus according to claim 5 wherein the threshold is programmable.

* * * * *